(12) United States Patent
Harper, III

(10) Patent No.: US 8,156,289 B2
(45) Date of Patent: Apr. 10, 2012

(54) HARDWARE SUPPORT FOR WORK QUEUE MANAGEMENT

(75) Inventor: David T. Harper, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 981 days.

(21) Appl. No.: 12/131,974

(22) Filed: Jun. 3, 2008

(65) Prior Publication Data

US 2009/0300333 A1     Dec. 3, 2009

(51) Int. Cl.
*G06F 12/00*     (2006.01)
*G06F 15/167*     (2006.01)

(52) U.S. Cl. .................. 711/147; 709/214; 711/E12.066

(58) Field of Classification Search .................. None
See application file for complete search history.

(56) References Cited

U.S. PATENT DOCUMENTS

| | | | |
|---|---|---|---|
| 6,289,369 B1 | 9/2001 | Sundaresan | |
| 6,728,959 B1 | 4/2004 | Merkey | |
| 6,745,262 B1 * | 6/2004 | Benhase et al. | 710/40 |
| 7,219,198 B2 * | 5/2007 | Sivaram et al. | 711/150 |
| 7,251,815 B2 | 7/2007 | Donovan et al. | |
| 7,269,179 B2 * | 9/2007 | Wolrich et al. | 370/412 |
| 7,555,579 B2 * | 6/2009 | Figueira | 710/52 |
| 2002/0046230 A1 | 4/2002 | Dieterich et al. | |
| 2005/0223382 A1 | 10/2005 | Lippett | |
| 2007/0220517 A1 | 9/2007 | Lippett | |

FOREIGN PATENT DOCUMENTS

WO     WO2007128168 A1     11/2007

OTHER PUBLICATIONS

Liaskovitis, et al. Brief Announcement: Parallel Depth First vs. Work Stealing Schedulers on CMP Architectures. In: SPAA'06, Jul. 30-Aug. 2, 2006, Cambridge, Massachusetts, USA. ACM 1-59593-262-3/06/0007. http://www2.pittsburgh.intel-research.net/~chensm/papers/PDF_short_spaa06.pdf. Last accessed May 1, 2008, 1 page.
Chen, et al. Hardware-Modulated Parallelism in Chip Multiprocessors. In Proceedings of Workshop on Design, Architecture and Simulation of Chip Multi-Processors Conference (dasCMP), held in conjunction with the 38th Annual International Symposium on Microarchitecture (MICRO), Barcelona, Spain, Nov. 2005. http://www.princeton.edu/~peh/publications/ndp_dasCMP.pdf. Last accessed May 1, 2008, 10 pages.

(Continued)

*Primary Examiner* — Reginald Bragdon
*Assistant Examiner* — Aracelis Ruiz
(74) *Attorney, Agent, or Firm* — Zete Law, P.L.L.C.; MacLane C. Key

(57) ABSTRACT

The claimed matter provides systems and/or methods that effectuate utilization of fine-grained concurrency in parallel processing and efficient management of established memory structures. The system can include devices that establish memory structures associated with individual processors that can comprise a parallel processing phalanx. The system can thereafter utilize various enqueuing and/or dequeuing directives to add or remove work descriptors to or from the memory structures individually associated with each of the individual processors thereby providing improved work flow synchronization amongst the processors that comprise the parallel processing complex.

20 Claims, 11 Drawing Sheets

OTHER PUBLICATIONS

Hendler, et al. A Dynamic-Sized Nonblocking Work Stealing Deque, Published online: Dec. 28, 2005. Distrib. Comput. (2005), DOI 10.1007/s00446-005-0144-5. http://www.cs.bgu.ac.il/~hendlerd/papers/dynamic-size-deque.pdf. Last accessed May 1, 2008, 19 pages.

Korch, et al. A Comparison of Task Pools for Dynamic Load Balancing of Irregular Algorithms, Feb. 26, 2002. Last accessed May 1, 2008, 32 pages.

Zargar. A Computational Approach to Edge Detection, Jun. 7, 2004. EEE6358 Computer Vision. Last accessed May 1, 2008, 17 pages.

Gschwind. Chip Multiprocessing and the Cell Broadband Engine. In: CF'06, May 3-5, 2006, Ischia, Italy, ACM 1-59593-302-6/06/0005. Last accessed May 1, 2008, 7 pages.

Blumofe, et al. Cilk: An Efficient Multithreaded Runtime System, Oct. 17, 1996. Published in The Journal of Parallel and Distributed Computing, 37(1):55-69, Aug. 25, 1996. Last accessed May 1, 2008, 26 pages.

Chase, et al. Dynamic Circular Work-Stealing Deque. In: SPAA'05, Jul. 18-20, 2005, Las Vegas, Nevada, USA. ACM 1-58113-986-1/05/0007. Last accessed May 1, 2008, 8 pages.

Bleloch. Nesl: A Nested Data-Parallel Language (version 2.6), Apr. 1993. CMU-CS-93-129. Last accessed May 1, 2008, 57 pages Hendler, et al. Non-Blocking Steal-Half Work Queues. In: PODC 2002, Jul. 21-24, 2002, Monterey, California, USA. ACM 1-58113-485-1-/02/0007. Last accessed May 1, 2008, 10 pages.

Smith. Open Dynamics Engine V0.5 User Guide, May 29, 2004. Last accessed May 1, 2008, 96 pages.

OpenMP Application Program Interface, Version 2.5, May 2005. Last accessed May 1, 2008, 250 pages.

Dubey. Recognition, Mining and Synthesis Moves Computers to the Era of Tera, Feb. 2005. Last accessed May 1, 2008, 10 pages.

Blumofe, et al. Scheduling Multithreaded Computations by Work Stealing. In: Proceedings of the 35th Annual IEEE Conference on Foundatins of Computer Science (FOCS'94), Santa Fe, New Mexico, USA, Nov. 20-22, 1994. Last accessed May 1, 2008, 13 pages.

Narlikar. Scheduling Threads for Low Space Requirement and Good Locality, May 1999, CMU-CS-99-121. Last accessed May 1, 2008, 23 pages.

Simon, et al. Science-driven system architecture: A new process for leadership class computing, Oct. 19, 2004, Paper LBNL-56545. http://repositories.cdlib.org/lbnl/LBNL-56545. Last accessed May 1, 2008, 18 pages.

Kwok, et al. Static Scheduling Algorithms for Allocating Directed Task Graphs to Multiprocessors. In: ACM Computing Surveys, vol. 31, No. 4, Dec. 1999. Last accessed May 1, 2008, 66 pages.

Frigo, et al. The Implementation of the Cilk-5 Multithreaded Language. In: Proceedings of the 1998 ACM SIGPLAN Conference on Programming Language Design and Implementation (PLDI), Montreal, Canada, Jun. 1998. Last accessed May 1, 2008, 12 pages.

Woo, et al. The SPLASH-2 Programs: Characterization and Methodological Considerations. In: Proceedings of the 22nd Annual International Symposium on Computer Architecture, Jun. 1995. Last accessed May 1, 2008, 13 pages.

Roberts, et al. WorkCrews: An Abstraction for Controlling Parallelism, Apr. 2, 1989. Last accessed May 1, 2008, 32 pages.

\* cited by examiner

HARDWARE SUPPORT FOR WORK QUEUE MANAGEMENT

BACKGROUND

The failure of microprocessors to continue their historic rate of frequency growth has forced the computer industry to use parallel processing to achieve performance scaling. This is a significant inflection point for the industry and it requires technology innovation to be successful.

Historically, parallel processing has been most successfully utilized to solve problems that can be decomposed into relatively large computations that have relatively low interaction rates with each other. Unfortunately, not all problem solutions can be mapped to this model. To make parallel processing more applicable to a wider variety of problems, it can be necessary to employ fine-grained concurrency (FGC). Fine-grained concurrency typically has been defined as solution methods in which each computation executes for as few as several hundred instructions before it interacts with another computation. Because interactions do not directly further the computation, they generally represent an overhead associated with parallel execution. Fine-grained concurrency is particularly concerned with the efficiency of these interactions because they occur relatively more frequently than the amount of computation that is being performed.

The subject matter as claimed is directed toward resolving or at the very least mitigating, one or all the problems elucidated above.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

Efficient management of work queues is necessary to enable the use of fine-grain concurrency in parallel computing systems. The claimed subject matter in accordance with an aspect provides an interface architecture suited for hardware implementation that enables efficient management of work queues. More particularly, the claimed subject matter, in accordance with a further aspect, bases memory structures associated with individual cores or processors in general purpose memory and provides general purpose interfaces to the memory structures.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
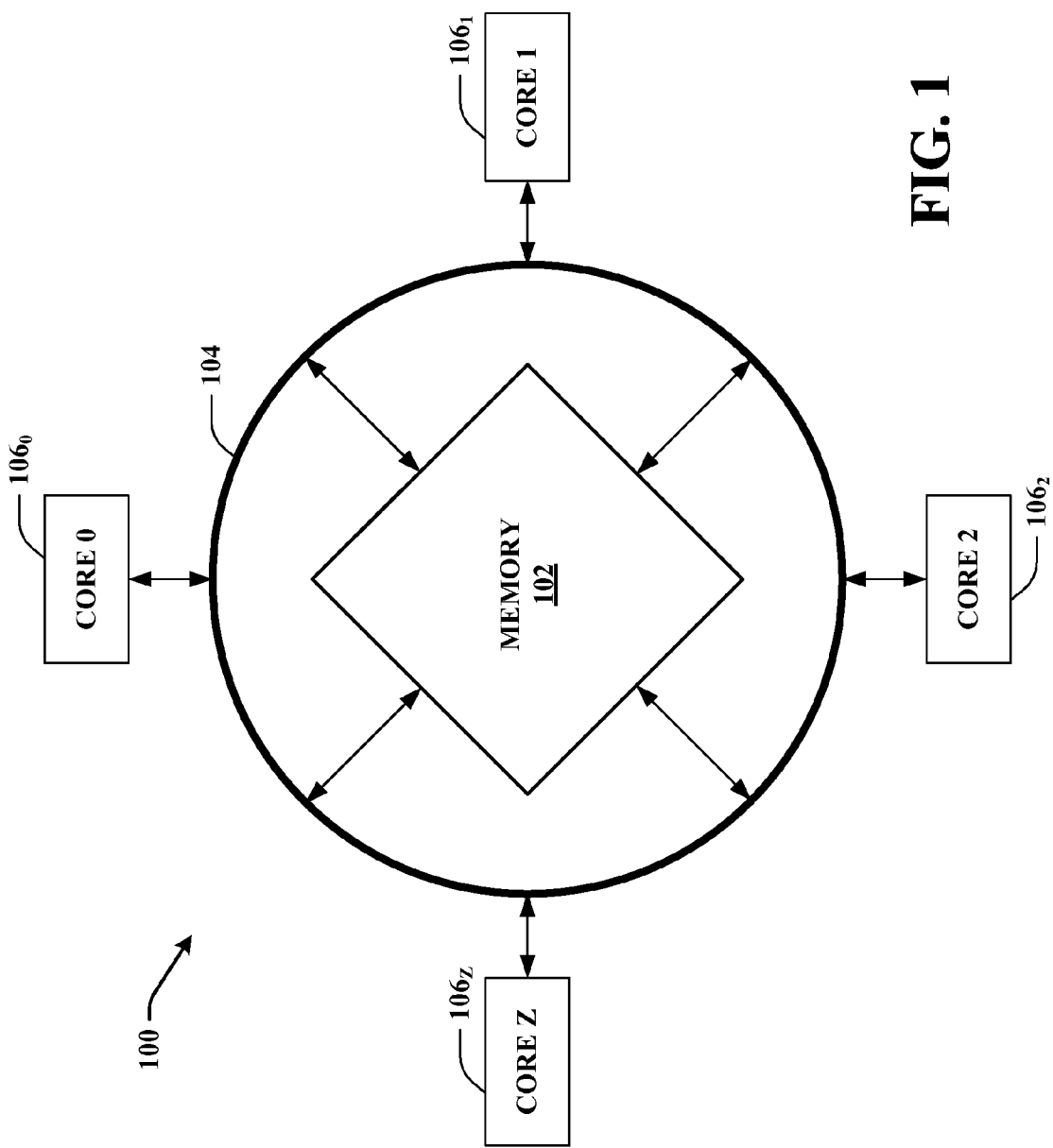
FIG. 1 illustrates a machine-implemented system that effectuates and/or facilitates utilization of fine-grained concurrency in parallel processing as well as enables efficient management of created memory structures in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

One programming model employed to implement fine-grained concurrency has been to dynamically decompose an application's computation into small pieces of work and then dynamically schedule the pieces onto a set of processors. An efficient way of doing this has been to use distributed queues to hold descriptions of work wherein each processor removes work descriptors from the queue when the processor becomes idle and adds work descriptors to the queue as new work items are created. A central issue in this approach is to assign a given piece of work to the processor best suited to perform the work—maximizing data locality is a prime concern in achieving this goal.

The matter as claimed in accordance with an aspect set forth herein implements work scheduling using distributed queues and work stealing to balance load across cores or processors. However, rather than utilizing specialized structures, the claimed matter defines general purpose interfaces that can be integrated to provide the required functionality. This approach enables flexibility in work scheduling and allows the interfaces to be employed to create functionality unrelated to work scheduling.

In particular, the subject matter as claimed utilizes existing and extant memory hierarchy to hold enqueued tasks in a memory structure (e.g., queue, stack, linked list, table, tree, and the like), where each memory structure is associated with each individual processor in the processor complex participating in the computation. The memory structure can typically support insertion and/or deletion of tasks from the head or tail end of the memory structure. Moreover, the claimed subject matter through utilization of the memory structure can hide the latency associated with dequeuing tasks. For instance, if a dequeue request is postponed until the processor or core has completed an executing task, such a delay can stall waiting for the next task. If the tasks are sufficiently small the accumulation of these stalls can amount to a significant fraction of execution time. Additionally, the claimed subject does not necessarily impose hard binding of cores or processors to specific memory structures; a memory based approach allows memory structures to be bound and managed by software (e.g., software in execution) policies that are adaptive to resource availability. Furthermore, the subject matter as claimed does not require an architectural definition of the contents of the memory structure; the structure generally can contain opaque 8 byte quantities which enables a broader use of primitives. Normal caching mechanisms can also be utilized in conjunction with the claimed matter to hide access latency.

FIG. 1 illustrates a system 100 that effectuates and/or facilitates utilization of fine-grained concurrency in parallel processing as well as enables efficient management of work queues in accordance with an aspect of the claimed subject matter. As illustrated system 100 can include memory 102 coupled to communication bus 104 and through communication bus 104 memory 102 can be further coupled to cores or processors $106_0, 106_1, 106_2, \ldots, 106_Z$. Memory 102 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Memory 102 of the subject systems and methods is intended to comprise, without being limited to, these and any other suitable types of memory. In addition, it is to be appreciated that memory 102 can be a server, a database, a hard drive, and the like. Moreover, it should be noted that while memory 102 has been depicted as a single infrangible whole, it will be appreciated that memory 102 can be, and can include, distributed memory dispersed over the wide ambit of a wired and/or wireless communication network.

Communication bus 104 can couple the components that comprise system 100 together and can be any of several types of bus structure that can interconnect memory 102 and processors or cores $106_0, 106_1, 106_2, \ldots, 106_Z$ to one another. Further communication bus 104 can interconnect to a memory bus, a peripheral bus, and/or a local bus using a variety of commercially available bus architectures (e.g., bus, star, hypercube, and the like). Additionally and/or alternatively, communication bus 104 can form part of a network topology upon which cores or processors $106_0, 106_1, 106_2, \ldots, 106_Z$ and memory 102 can form one of many constituent (e.g., local or remote) elements. Illustrative network topologies that can be utilized by the claimed subject matter can include any viable communication and/or broadcast technology, for example, wired and/or wireless modalities and/or technologies can be utilized to effectuate the claimed subject matter. Moreover, the network topology can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof.

Cores or processors $106_0, 106_1, 106_2, \ldots, 106_Z$ (hereinafter referred to collectively as "core or processor complex 106") as will be appreciated by those moderately skilled in this field of endeavor, can be a singe monolithic processor, but more commonly can include more than one processor and in most instances can comprise many hundred, thousands, or hundreds of thousands of processors coupled to one another through communication bus 104. Core or processor complex 106 can include any of various and disparate commercially available processors (e.g., 8-bit, 16-bit, 32-bit, 64-bit, etc.). Dual, quad, and other multi-processor architectures can also be employed as, or be included with, core or processor complex 106. Additionally and/or alternatively, core or processor complex 106 can be implemented entirely in hardware and/or a combination of hardware and/or software in execution. Further, core or processor complex 106 can be, but is not limited to, any type of machine that includes a processor and/or is capable of effective communication with communication bus 104. Illustrative machines that can comprise core or processor complex 106 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, multimedia players, and the like.

Figure 2:
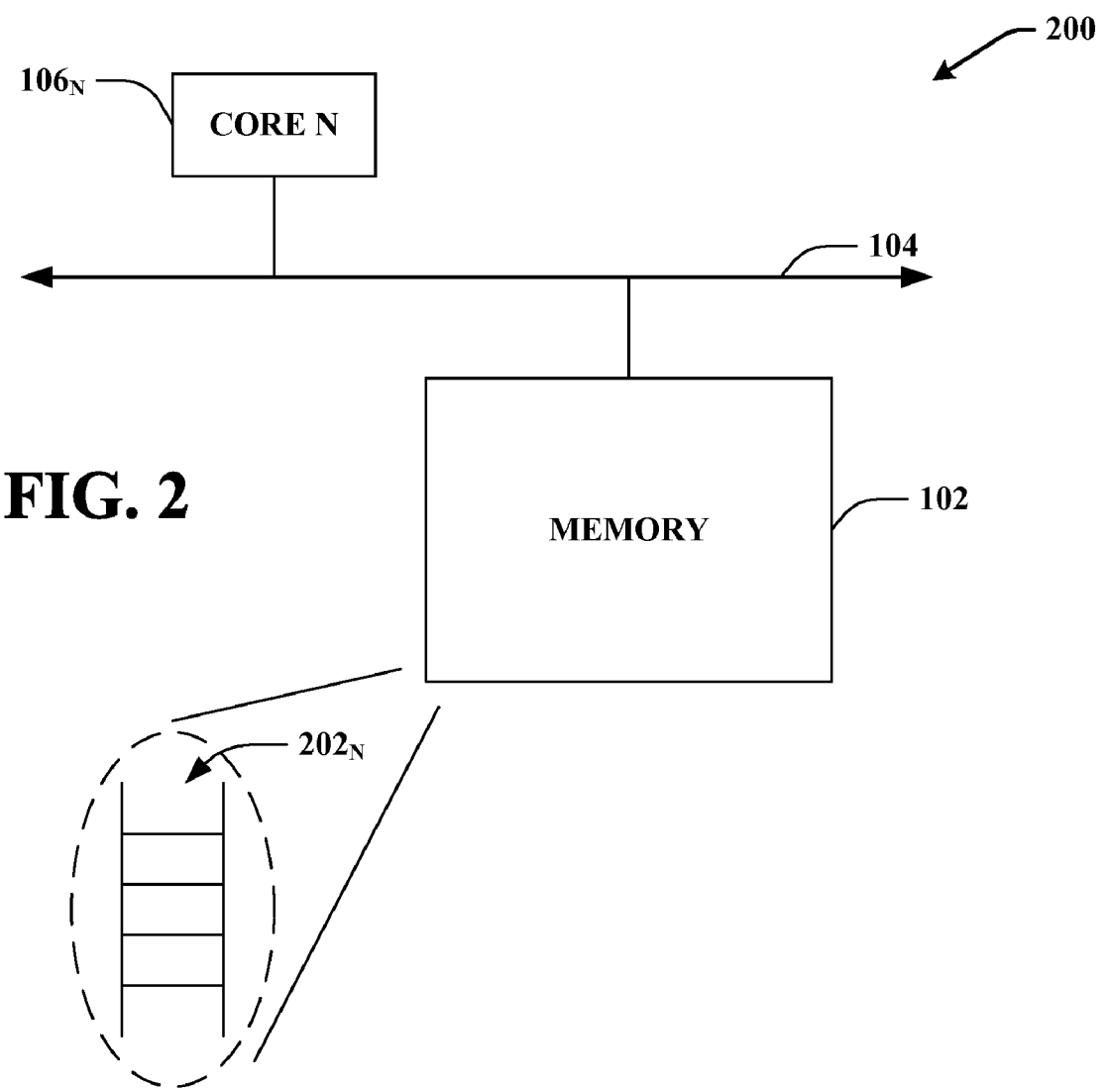
FIG. 2 depicts machine-implemented system that effectuates and/or facilitates utilization of fine-grained concurrency in parallel processing as well as enables efficient management of established memory structures in accordance with an aspect of the claimed subject matter.

FIG. 2 provides further illustration of a system 200 that effectuates and/or facilitates utilization of fine-grained concurrency in parallel processing as well as enables efficient management of work queues in accordance with an aspect of the claimed subject matter. FIG. 2 depicts a single core or processor $106_N$ from the greater core or processor complex 106 mentioned above. Further as exemplified in FIG. 2 core or processor $106_N$ can be in continuous and/or operative or sporadic and/or intermittent communication with other processors or cores that can constitute processor complex 106 as well as memory 102. Memory 102 can include a memory structure $202_N$; a structure associated specifically with processor $106_N$ and that contains work or task descriptors that have been allocated or assigned to core or processor $106_N$ to perform. It should be noted that while the memory structure $202_N$ is said to be "associated specifically with processor $106_N$", the association or affiliation with processor $106_N$ is a dynamic one that can change over time as consequences and circumstances change.

It is from memory structure $202_N$ from which core or processor $106_N$ draws tasks or work descriptions, and to which core or processor $106_N$ adds new tasks or work descriptions when and if subsequent jobs are created as a consequence of current processing. While memory structure $202_N$ has been illustrated as a double-ended queue, it will be appreciated that other structures or combination of structures, such as stacks, trees, tables, linked lists, and the like, can be utilized, additionally and/or alternatively, with equal effect and efficacy. Accordingly, any and all these additional, alternative or combination structures can be considered to fall within the ambit and/or intent of the claimed subject matter.

Figure 3:
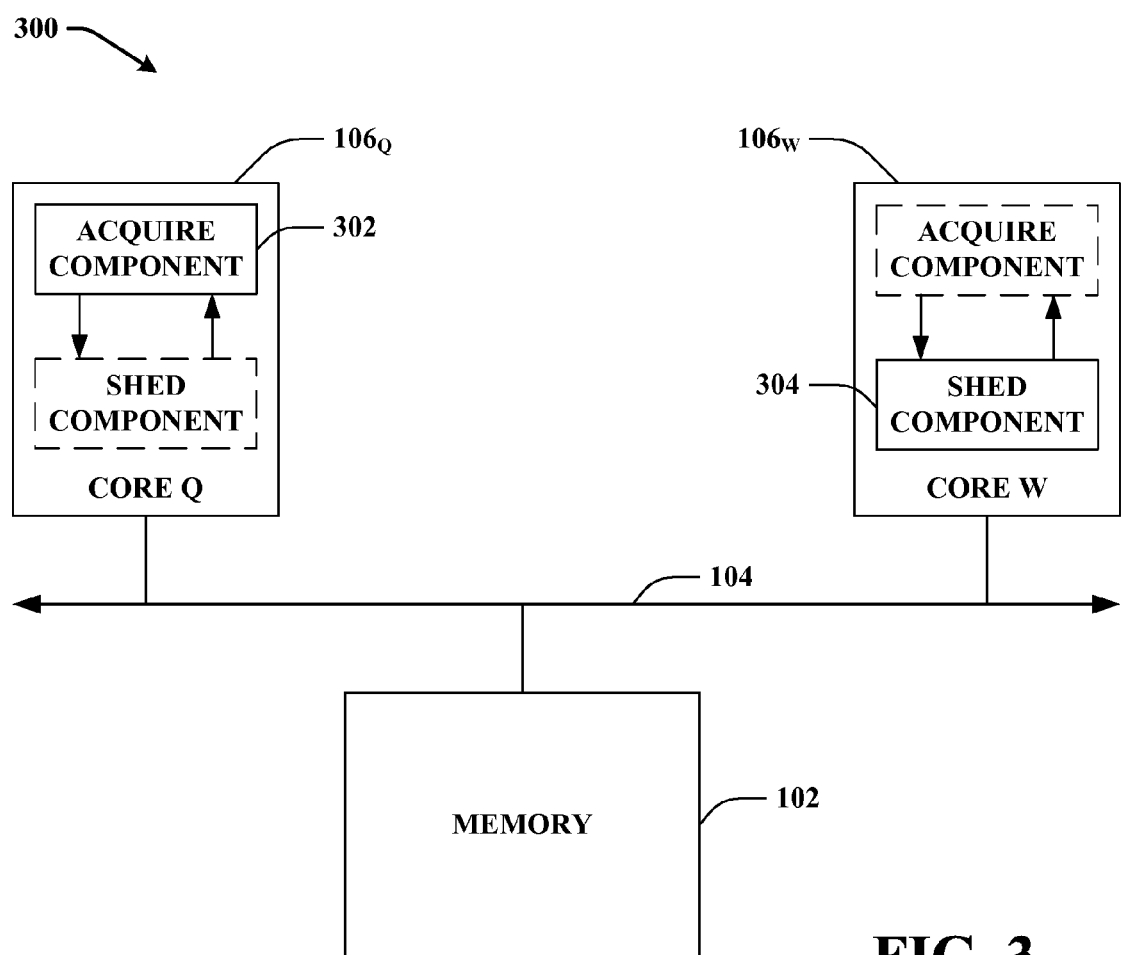
FIG. 3 provides further illustration of a machine implemented system that effectuates and/or facilitates utilization of fine-grained concurrency in parallel processing as well as enables efficient management of created memory structures in accordance with an aspect of the claimed subject matter.

FIG. 3 provides further illustration of a system 300 that effectuates and/or facilitates utilization of fine-grained concurrency in parallel processing as well as enables efficient management of work queues in accordance with an aspect of the claimed subject matter. FIG. 3 includes two illustrative cores or processors $106_Q$ and $106_W$, respectively, gleaned from a larger core or processor complex 106. As exemplified, illustrative cores or processors $106_Q$ and $106_W$, can be in continuous and/or operative or sporadic and/or intermittent communication, via communication bus 104, with memory 102 as well as other components and/or processors or cores that can comprise the larger core or processor complex 106.

Further as illustrated in FIG. 3, each core or processor (e.g., core or processor $106_Q$ and $106_W$) can include acquire component 302 and shed component 304. Acquire component 302 can be utilized whenever a processor or core (e.g., core or processor $106_Q$ or $106_W$) is running low on jobs to perform (e.g., as indicated by task descriptors that populate their associated memory structures). When acquire component 302 detects that a low watermark in terms of task descriptors has been encountered or is imminent, acquire component 302 can investigate the memory structures associated with other processors or cores included in the core or processor complex 106 to identify tasks that can be capably performed by its own processor or core. For example, if core $106_Q$ were about to run into a deficit situation in terms of tasks to perform, acquire component 302 can investigate the memory structures associated with the multitude of cores included in the core complex and deduce that core $106_Q$ is capable, without want or hindrance, of performing the excess tasks associated with core $106_W$. In this instance, where acquire component 302 has identified that core $106_W$ has a surfeit of tasks descriptors in its associated memory structure, it can steal the tasks (e.g., move the surplus task descriptors) from the memory structure associated with core $106_W$ and place these acquired tasks (e.g., the task descriptors) into the memory structure associated with core $106_Q$.

Conversely, where a core experiences or is in imminent jeopardy of experiencing an upsurge of tasks to perform (e.g., a high watermark is detected), shed component 304 can detect such a plenitude of tasks and commence sloughing off tasks to those cores or processors in core or processor complex 106 capable of performing the redistributed tasks. For instance, where core $106_Q$ and core $106_W$ are mutually compatible and/or capable processors or cores and core $106_W$ becomes overextended or suffers a diminishment in capacity, shed component 304 associated with core $106_W$ can investigate the memory structures confederated with the multitude of cores included in the core complex 106 and deduce that core $106_Q$ is capable of adequately performing those excess tasks that core $106_W$ is currently incapable of performing. Shed component 304 can thereafter initiate redistribution of the excess task descriptors from the memory structure associated with core $106_W$ into the memory structure associated with core $106_Q$.

As has been intimated thus far, the claimed subject matter, rather than employing dedicated hardware structures, utilizes a combination of generic hardware and software policies, or a software in execution approach, such as a process or software running on a non-specific processor, a stereotypical processor, a hard disk drive, multiple storage drives, multiple disparate generalized processors, and the like. The claimed matter constructs or establishes memory structures (e.g., queues, trees, linked lists, tables, etc.) in memory and addresses the performance issue of synchronization by providing some instruction set architecture support.

In terms of providing instruction set architecture support, the claimed subject matter can add instruction set primitives to the system. For instance, the claimed matter can define where the memory structures should be located in memory (e.g., memory 102). The additional instructions, such as, enqueue and dequeue where the memory structure is implemented as a queue structure, can handle the synchronization necessary to effectuate the claimed matter so that it is totally transparent to the executing software. Moreover, the additional instructions are sufficiently flexible in that there are, to continue the queuing paradigm further, instructions for adding at the head of the queue or at the tail of the queue.

Traditionally, work stealing operations, for performance reasons, typically utilize one end of the queue in preference to the other (e.g., the tail), whereas addition and/or subtraction of work entries by the local processor (e.g., the processor that "owns" the work queue) is done at the other end of the queue. Such work stealing operations can have beneficial performance ramifications from a software perspective.

As has been previously stated, memory structures (e.g., queues) can be associated with each processor in the core or processor complex 106. The memory structures associated with each processor can be substantially identical or symmetric from the perspective of the single processor (e.g., $106_0$, $106_1$, $106_2$, $106_N$, $106_Q$, $106_W$, $106_Z$) . . . ). Accordingly, if a particular memory structure confederated with a processor were to become empty, the processor associated with such a memory structure can commence performance of work stealing by accessing the memory structures associated with different and disparate processors included in the core or processor complex 106. In order to actuate such work stealing behavior the processor undertaking work stealing can utilize or access instructions (e.g., in furtherance of foregoing queue exemplification: ENQUEUE_HEAD, ENQUEUE_TAIL, DEQUEUE_HEAD, DEQUEUE_TAIL) but, rather than applying these directives on the memory structure allied with the work stealing processor, the instructions can be directed towards memory structures associated with the other processors included in the core or processor complex 106.

Implicit in the foregoing synopsis is the fact that each memory structure (e.g., queue) affiliated with a processor in core or processor complex 106 can be named by where it resides in memory 102. The advantage of such an arrangement being that the memory structures all have unique names associated with their location in memory space. Accordingly, a processor knows where to find its attendant memory structure and further is also cognizant of where all the other memory structures related to other processors in the core or processor complex 106 can be located. Thus, by applying insert and remove operations to the different queues associated with the disparate processors in the complex, a processor can receive and/or discard work descriptors from whichever memory structure that the processor decides to operate on.

Figure 4:
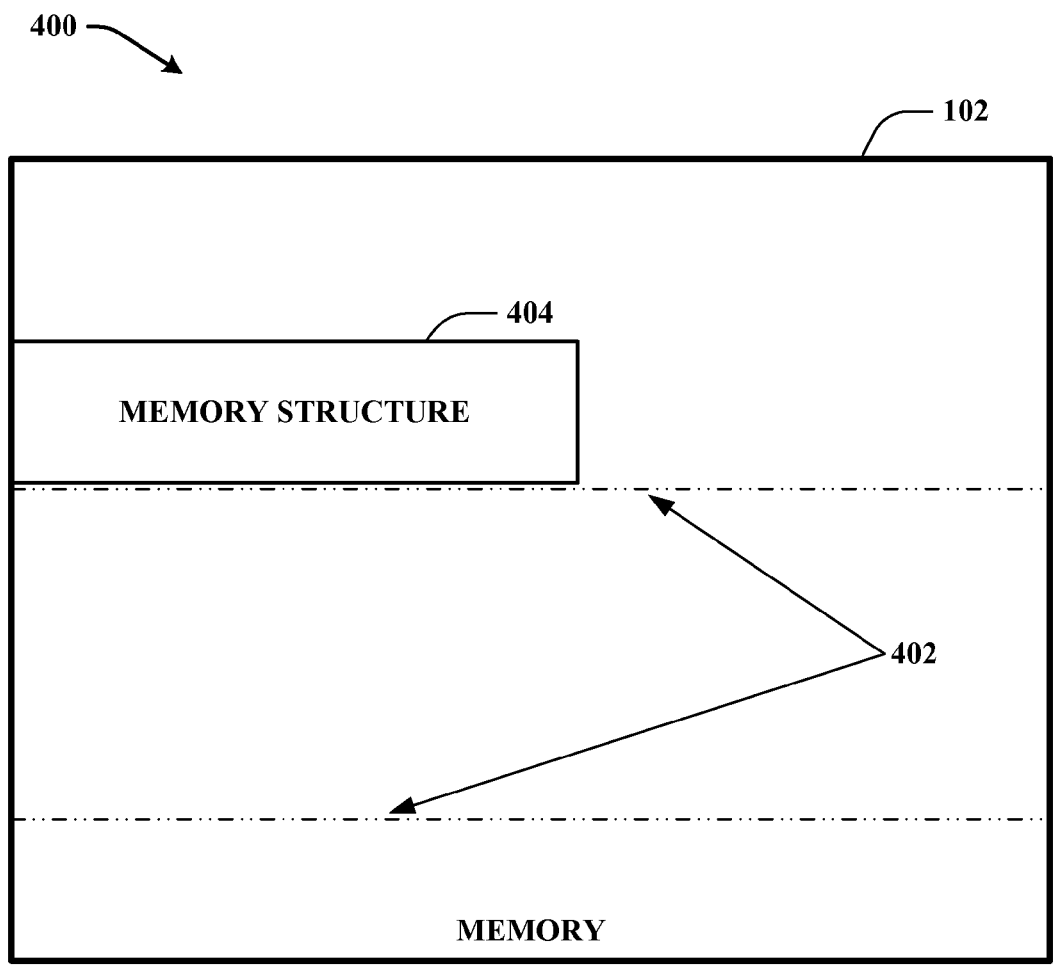
FIG. 4 provides a more detailed depiction of a memory that effectuates and/or facilitates utilization of fine-grained concurrency in parallel processing as well as enables efficient management of established memory structures in accordance with an aspect of the claimed subject matter.

Turning now to FIG. 4 which provides further illustration of memory 102 in accordance with an aspect of the claimed subject matter. As illustrated memory 102 can include multiple page boundaries, two of which are depicted and represented as item 402. Additionally, memory 102 can include a memory structure 404 (e.g., a Q structure) that can typically be situated or aligned to a page boundary to simplify address translation issues. Memory structure 404 typically can contain 8 bytes of metadata and the 2 KB data area. The 2 KB sized data area is equal one half the size of the smallest page in the system (e.g., assumed to be 4 KB) so that pointer arithmetic, if appropriate, can be done efficiently. Moreover, each entry in the data area can have a fixed size of 8 bytes which leads to a maximum memory structure 404 occupancy of 256, where for example, memory structure 404 is implemented as a queue. It should be noted that memory structure 404 is representative of but one memory structure associated with one processor in the multitude of processors or cores that can form the phalanx of cores or processors. Accordingly, as will be readily appreciated by those moderately skilled in the art, memory 102 can be replete with similar memory structures, each aligned to a page boundary in memory 102 and each distinctly liaising with its affiliated processor.

Figure 5:
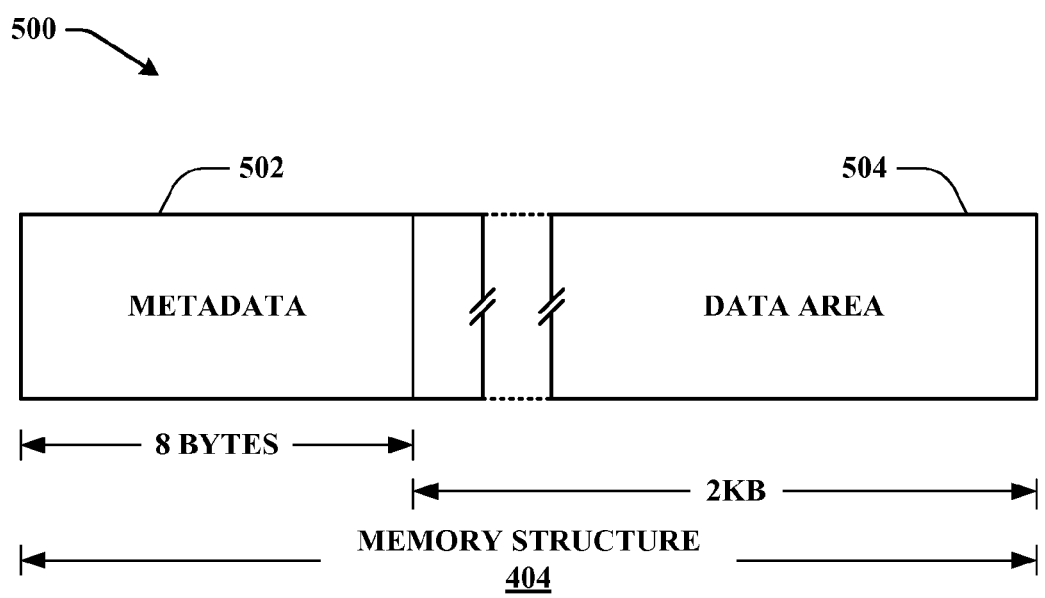
FIG. 5 provides depiction of an illustrative memory structure that can be employed to effectuate and/or facilitate utilization of fine-grained concurrency in parallel processing as well as enables efficient management of created memory structures in accordance with an aspect of the claimed subject matter.

FIG. 5 provides illustration of the layout of the memory structure 404. As indicated above, memory structure 404 can be aligned to a page boundary in memory 102 in order to simplify address translation issues. As illustrated, memory structure 404 can comprise metadata 502 and data area 504 wherein metadata 502 is 8 bytes long and data area 504 has a 2 KB capacity. The 2 KB capacity restraint for data area 504 is based on the assumption that the smallest page in memory 102 is 4 KB and thus data area 504 is set to be ½ the size of the smallest page. Moreover, by setting the data area to be ½ the size of the smallest page in memory 102 ensures that pointer arithmetic can be performed efficiently with little overhead. Nevertheless, as will be appreciated by those of ordinary skill in this field of endeavor, data area 504 can be sized according to other criteria (e.g., can, depending on the memory page size provided by the core or processor architecture, be smaller or larger than the 2 KB set forth herein) without departing from the spirit, intent, or scope of the claimed subject matter.

Figure 6:
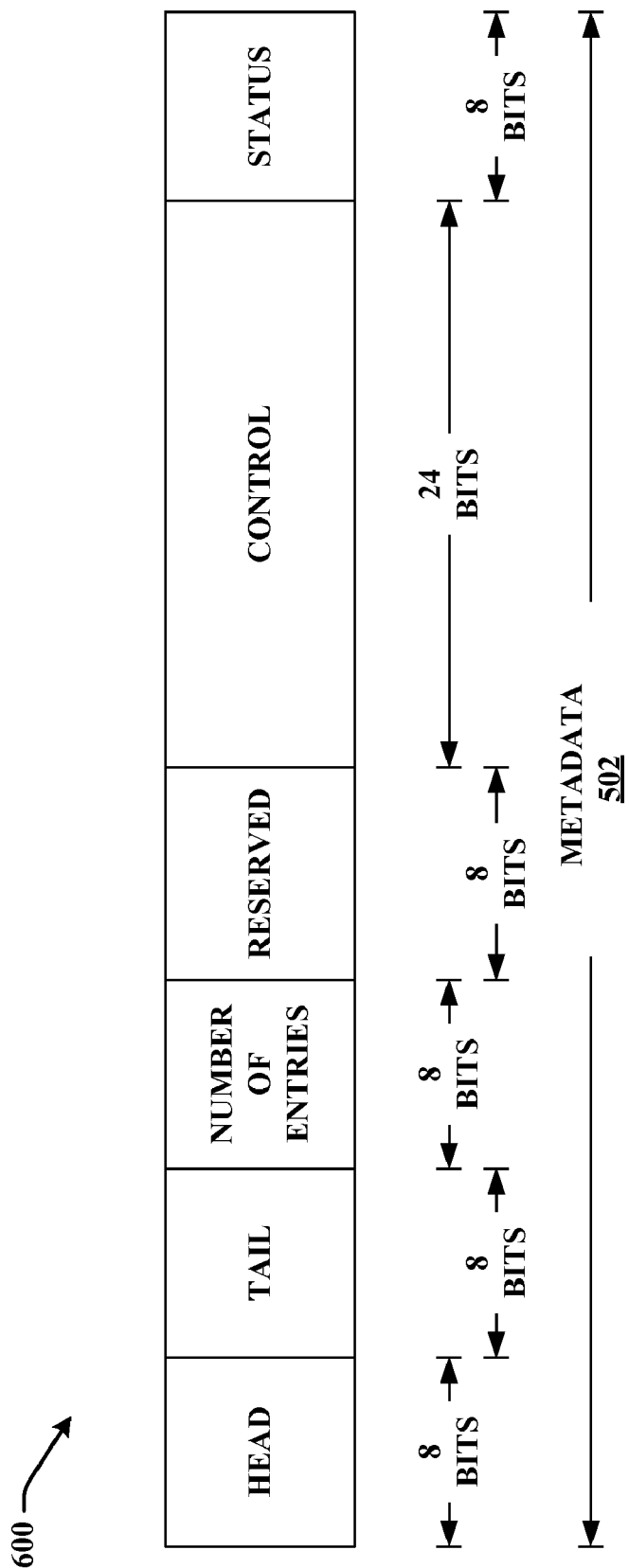
FIG. 6 provides a further depiction of an aspect of the memory structure that effectuates and/or facilitates utilization of fine-grained concurrency in parallel processing as well as enables efficient management of created memory structures in accordance with an aspect of the subject matter as claimed.

FIG. 6 provides further illustration of metadata aspect 502 of memory structure 404 in accordance with an aspect of the claimed matter. In accordance with this instance of the claimed subject matter, memory structure 404 can, without limitation, be a queue structure (e.g., a double ended queue) implemented in memory 102, and thus metadata aspect 502 can pertain to such a queue structure. As illustrated metadata 502 can include an 8 bit head field which can be an index into data area 504. Typically, the initial value assigned to the head field is 0; assuming that the field is not full, the head is generally the next place to write at the head of the queue structure; conversely, assuming that the field is not empty, (H−1 modulo 256) is generally the next place to read from the head of the queue structure.

Further metadata aspect 502 can also include an 8 bit tail field which, like the head field above, can be an 8 bit index into data area 504 wherein the initial value assigned to this field is 0. Thus, assuming the field in not full, the tail is typically the next place to write at the tail of the queue structure, and assuming that the field is not empty, T+1 is the next place read from at the tail of the queue structure.

Metadata aspect 502 can further include an 8 bit field for the number of valid entries in the queue structure wherein the initial value assigned this field is generally 0. Metadata aspect 502 can also include an 8 bit reserved field which, as the name suggests, is reserved. Additionally, metadata aspect 502 can also include a 24 bit control field that will be discussed in connection with FIG. 7, as well as an 8 bit status field explicated in relation to FIG. 8.

Figure 7:
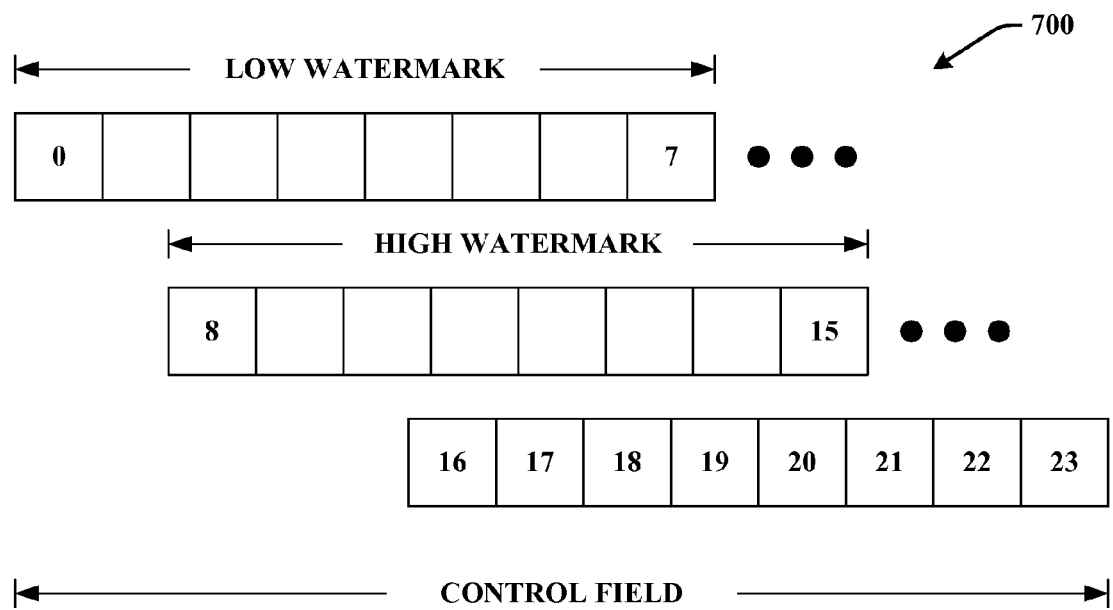
FIG. 7 illustrates yet a further aspect of the memory structure that effectuates and/or facilitates utilization of fine-grained concurrency in parallel processing as well as enables efficient management of created memory structures in accordance with an aspect of the claimed subject matter.

FIG. 7 provides illustration of a 24 bit control field 700 that can be included within metadata aspect 502 in accordance with an aspect of the claimed matter. The first 8 bits (lwm) of the control field 700 (e.g., bits 0-7) can be utilized to persist the value of a low watermark associated with the queue structure and the second eight bits (hwm) of control field 700 (e.g., bits 8-15) can be employed to persist the value of a high watermark associated with the queue structure. Further, bit 16 (i_on_lwm) of control field 700 can be utilized to generate an interrupt following a read from memory structure 404 when a low watermark is reached (e.g., N=low watermark). Generally, generation of interrupts on low watermarks can be disabled following generation of the interrupt and/or service routine can be re-enabled if desired. Furthermore, bit 17 (i_on_hwm) of control field 700 can be employed to generate an interrupt following a write to memory structure 404 when a high watermark is reached (e.g., N=high watermark). Typically, generation of interrupts on high watermarks can be disabled following generation of the interrupt and/or service routine can be re-enabled if desired.

Additionally, bit 18 (h_noallocate) of control field 700 can be utilized, on a write to memory structure 404 using a pointer utilized to point to the head (e.g., H pointer) of memory structure 404, to desist from allocating the cache line containing the memory structure entry into the cache. Typically, no eviction is performed if the cache line already exists in cache. Similarly, bit 19 (t_noallocate) of control field 700 can be employed, on write to memory structure 404 using a pointer utilized to point to the tail (e.g., T pointer) of memory structure 404, to refrain from allocating the cache line containing the memory structure entry into the cache. Generally, no eviction takes place where the cache line is already extant in cache.

Bit 20 (h_qcw_noallocate) of control field 700 can be utilized to, on an instruction set architecture (ISA) extension operation based on the H pointer, not allocate the cache line containing metadata 502 into the cache. Similarly, bit 21 (t_qcw_noalloacte) can be employed to, on an instruction set architecture (ISA) extension operation based in the T pointer, not allocate the cache line containing metadata 502 into the cache.

Bit 22 (lock_T) of control field 700 can be employed to inhibit access to memory structure 404 through utilization of TAIL based instruction set architecture (ISA) extensions. Similarly, bit 23 (lock_H) of control field 700 can be utilized to inhibit access to memory structure 404 through utilization of HEAD based instruction set architecture (ISA) extensions. The initial value of control field 700 is typically set to 0x00ff00 which effectively disables interrupts and watermark based behavior (e.g., almost_empty==empty, almost_full==full) Details of the instruction set architecture (ISA) extensions as applied to memory structure 404 is provided infra.

Figure 8:
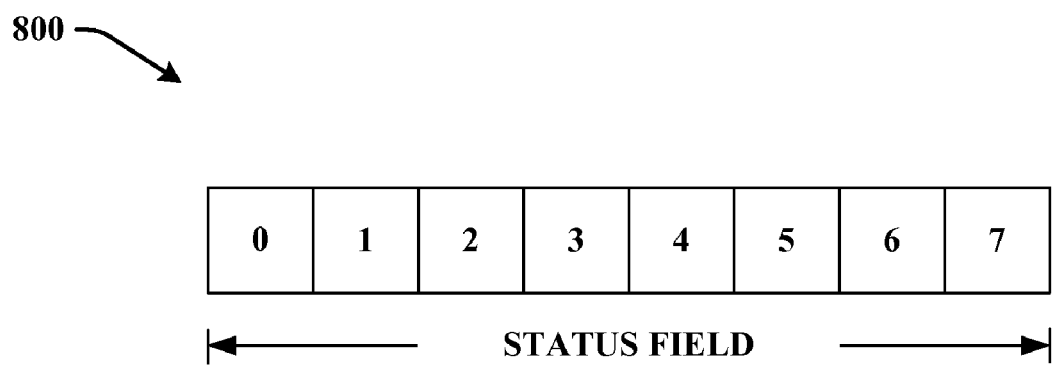
FIG. 8 depicts a further aspect of the memory structure that effectuates and/or facilitates utilization of fine-grained concurrency in parallel processing as well as enables efficient management of created memory structures in accordance with an aspect of the claimed subject matter.

Turning now to FIG. 8 that illustrates the 8 bit status field 800 that can be associated with metadata aspect 502 in accordance with an aspect of the claimed matter. Bit 0 (empty) can provide indication that the number of work descriptors in the memory structure equals zero (e.g., N=0). Bit 1 (full) provides indication that the number of work descriptor in the memory structure is at the maximum point (e.g., N==256). Bit 2 (almost_empty) indicates that the number of descriptors associated with the memory structure is less than or equal to a low watermark (e.g., N<=lwm) and bit 3 (almost_full) indicates that the number of task descriptors associated with the memory structure is greater than or equal to a high watermark (e.g., N>=hwm). Bits 4-6 (reserved) of status field 800 can in this instance of the claimed subject matter can be reserved, and bit 7 (locked) can be utilized to denote a locked status. The initial value of status field 800 is typically set to 0x05.

As suggested above instruction set architecture (ISA) extensions can be provided for initialing memory structure 404 and for adding and/or removing entries at the front of memory structure 404 (defined by the head field of metadata 502) or the rear of memory structure 404 (defined by the tail field of metadata 502). Generally, all instruction set architecture (ISA) extensions set forth and disclosed herein return status in a register (e.g., EFLAGS register). The instruction set architecture (ISA) extensions and return status code are provided below.

| Return Status | ZF | OF | CF | PF | SF | |
|---|---|---|---|---|---|---|
| Normal completion | 1 | X | X | X | 1 | == remote |
| Full/empty | X | 1 | X | X | 1 | == remote |
| Almost_full/almost_empty | X | X | 1 | X | 1 | == remote |
| Locked | X | X | X | 1 | 1 | == remote |

The above table provides respective return status codes; remote indicates that execution occurred remotely.

The claimed subject matter can provide an initialization instruction set architecture (ISA) extension where low order bits (page offset) of base are ignored and quadword at memory byte address base+2048 is initialized to be the memory structure's initial state. Further, the claimed matter can provide an instruction set architecture (ISA) extension that enables the appending of tasks to the head of the memory structure initialized by the above initialization aspect of the instruction set architecture (ISA) extension. The pseudo code representative of appending tasks to the head of the memory structure is presented below. It should be noted that QCW hereinafter refers to metadata aspect 502.

```
ENQUEUE_HEAD(base, d) semantics
Atomic{
    if (QCW(base).locked) return STRUCTURE_WAS_LOCKED
    if (QCW(base).N == 256) return STRUCTURE_WAS_FULL
    QCW(base).N++
    h = QCW(base).H
    M[base + h] = d
    QCW(base).H = (h + 1) modulo 256
    if (N == QCW(base).hwm) return (NORMAL |
ALMOST_FULL)
    return NORMAL
}
```

Additionally, the claimed matter can provide an instruction set architecture (ISA) extension that enables the appending of tasks to the tail of the memory structure initialized by the initialization aspect of the instruction set architecture (ISA) extension. Pseudo code representative of appending tasks to the tail of the memory structure is presented below:

```
ENQUEUE_TAIL(base, d) semantics
Atomic{
    if (QCW(base).locked) return STRUCTURE_WAS_LOCKED
    if (QCW(base).N == 256) return STRUCTURE_WAS_FULL
    QCW(base).N++
    t = (QCW(base).T – 1) modulo 256
    QCW(base).T = t
    M[base + t] = d
    if (N == QCW(base).hwm) return (NORMAL |
ALMOST_FULL)
    return NORMAL
}
```

Moreover, the claim matter can provide an instruction set architecture (ISA) extension that provides for the removing of tasks from the head of the memory structure initialized by the initialization aspect of the instruction set architecture (ISA) extension. Pseudo code representative of removing tasks from the head of the memory structure is presented below:

```
DEQUEUE_HEAD(base, r) semantics
Atomic{
    if (QCW(base).locked) return STRUCTURE_WAS_LOCKED
    if (QCW(base).N == 0) return STRUCTURE_WAS_EMPTY
    QCW(base).N--
    t = (QCW(base).T + 1) modulo 256
    QCW(base).T = t
    r = M[base + t]
    if (N == QCW(base).lwm) return (NORMAL |
ALMOST_EMPTY)
    return NORMAL
}
```

Additionally, the claim matter can also provide an instruction set architecture (ISA) extension that provides for the removing of tasks from the tail of the memory structure initialized by the initialization aspect of the instruction set architecture (ISA) extension. Pseudo code representative of removing tasks from the tail of the memory structure is presented below:

```
DEQUEUE_TAIL(base, r) semantics
Atomic{
    if (QCW(base).locked) return STRUCTURE_WAS_LOCKED
    if (QCW(base).N == 0) return STRUCTURE_WAS_EMPTY
    QCW(base).N--
    h = (QCW(base).H – 1) modulo 256
    QCW(base).H = h
    r = M[base + h]
    if (N == QCW(base).lwm) return (NORMAL |
ALMOST_EMPTY)
    return NORMAL
}
```

By convention the ENQUEUE_HEAD and DEQUEUE_HEAD instruction extensions are typically utilized to add and/or remove work items to or from a local memory structure (e.g., the memory structure associated with a particular processor) whereas ENQUEUE_TAIL and DEQUEUE_TAIL instruction extensions are generally employed to work steal from another processor's memory structure or to shed work to another processor's memory structure.

It should be noted that while the claimed matter has been explicated in many instances in terms of queues and queuing structures, the matter as claimed is nevertheless not necessarily so limited as other structural and/or memory management techniques can be utilized with equal or equivalent effect without departing from the intent, scope, or purview of the claimed subject matter.

Figure 9:
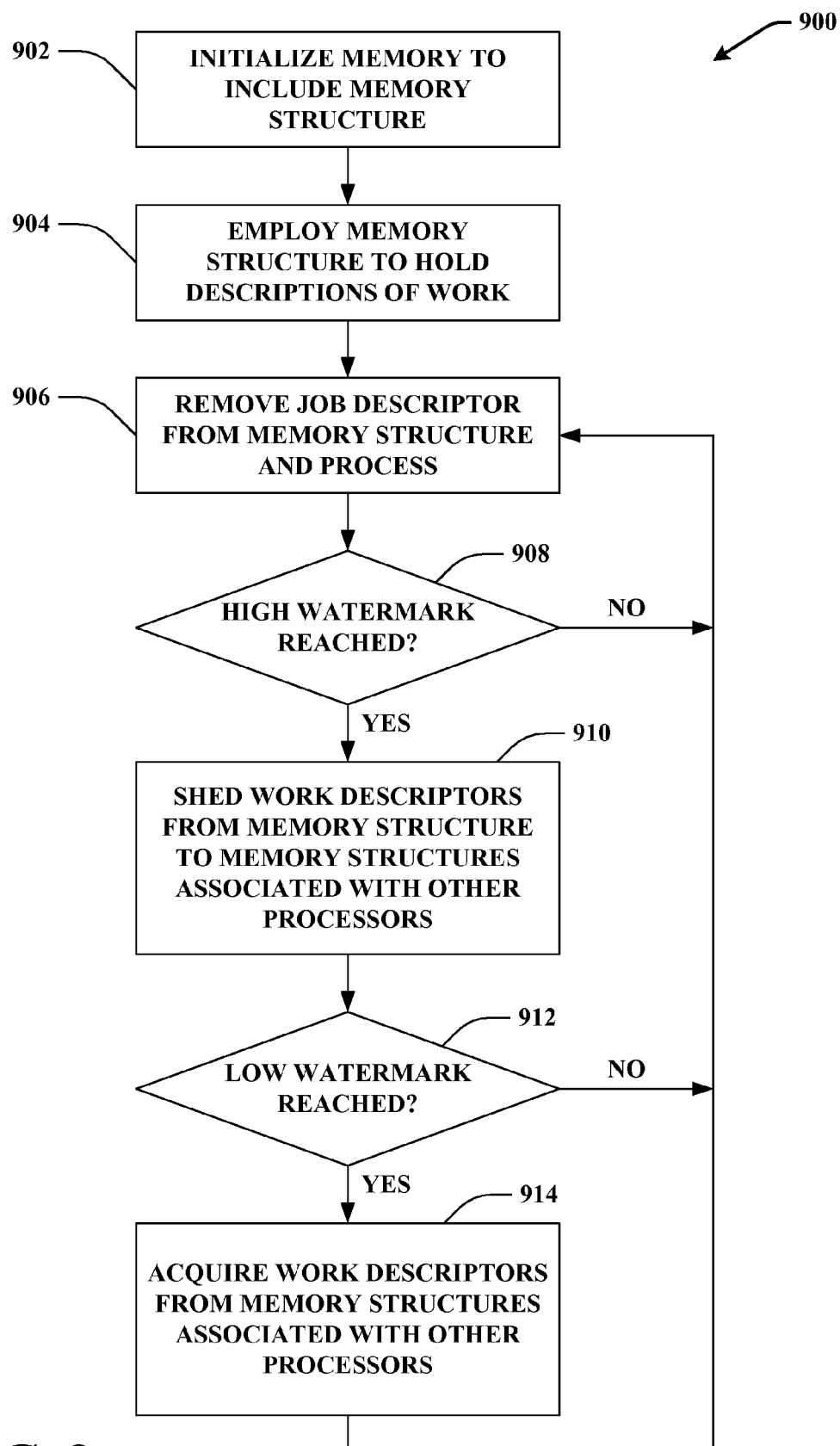
FIG. 9 illustrates a flow diagram of a machine implemented methodology that effectuates and/or facilitates utilization of fine-grained concurrency in parallel processing as well as enables efficient management of created or pre-established memory structures in accordance with an aspect of the claimed subject matter.

In view of the illustrative systems shown and described supra, methodologies that may be implemented in accordance with the disclosed subject matter will be better appreciated with reference to the flow chart of FIG. 9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 9 provides illustration of a machine implemented methodology 900 that effectuates and/or facilitates utilization of fine-grained concurrency in parallel processing as well as enables efficient management of created or pre-established memory structures in accordance with an aspect of the claimed subject matter. Method 900 can commence at 902 where an instruction set architecture (ISA) extension operation can be utilized to initialize or establish a memory structure (e.g., queue, stack, linked list, table, tree, etc.) in an associated memory space. Typically, the memory structure can be established at byte offset 2048 relative to a base specified by the initialization instruction set architecture (ISA) extension operation. At 904 the established memory structure (typically associated or tied with a particular processor included in a parallel processor phalanx) can be utilized to hold descriptions of work items that need to be performed (e.g., ENQUEUE_HEAD operation can be utilized). At 906 a job description can be removed from the memory structure (e.g., DEQUEUE_HEAD operation can be employed). At 908 a determination can be made as to whether a high watermark has been reached. If it is determined at 908 that a high watermark has been attained (e.g., YES) then at 910 work descriptions can be shed from the memory structure associated with the "overworked processor" to a memory structures associated with relatively underutilized processors capable of undertaking the offloaded work items (e.g., ENQUEUE_TAIL operations can be effectuated on memory structures associated with underutilized processors). If on the other hand it is determined at 908 that a high watermark has not been reached (e.g., NO) method 900 can cycle back to 906. At 912 a further determination can be made as to whether a low watermark has been reached. If it is ascertained that a low watermark has been attained (e.g., YES) then at 914 a process can be implement to commence work stealing from memory structures associated with over worked processors (e.g., DEQUEUE_TAIL operations can be actuated on memory structures associated with over utilized processors) after which method 900 can cycle back to 906. Where it is determined at 912 that a low watermark has not been reached (e.g., NO) method 900 can return to 906.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
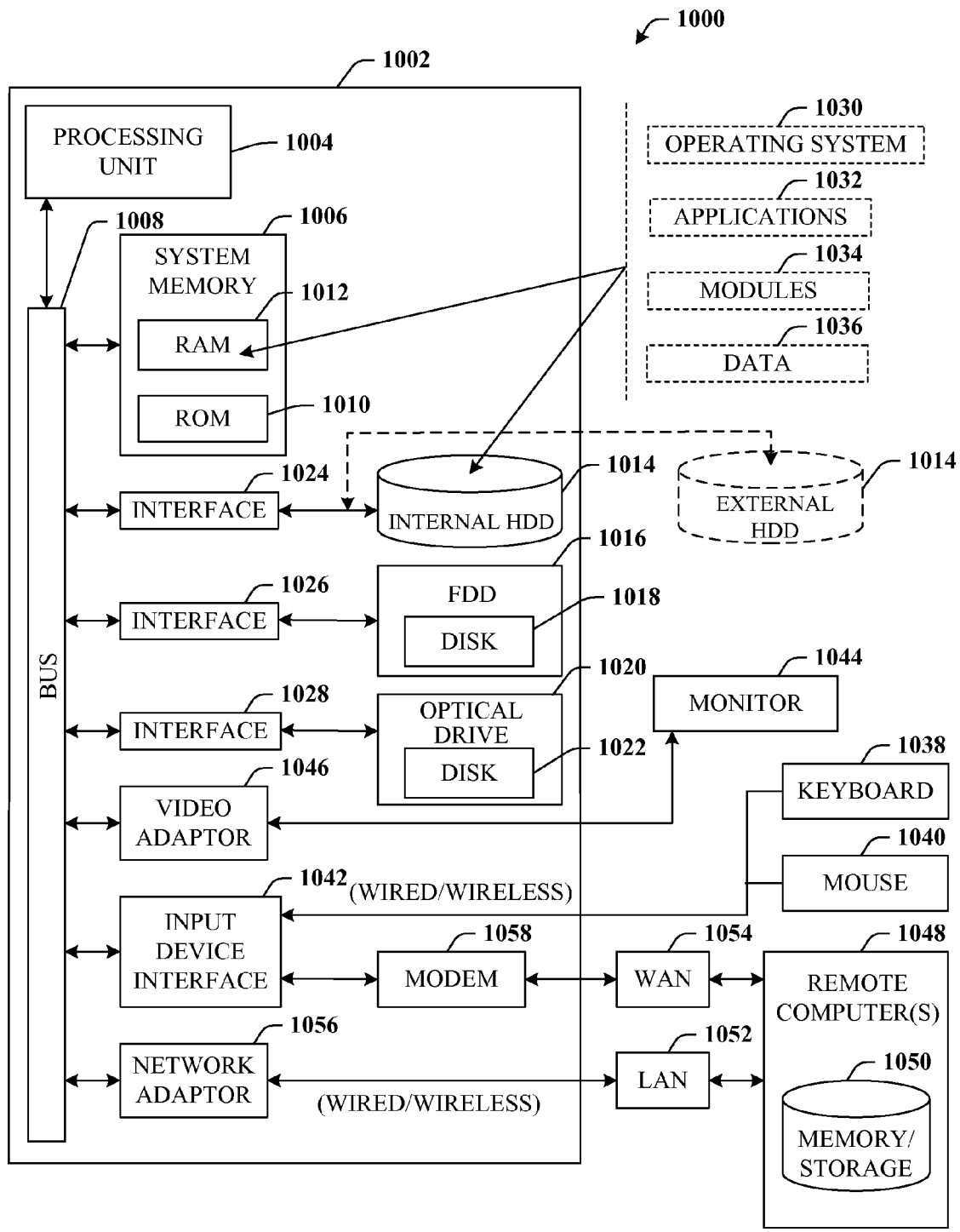
FIG. 10 illustrates a block diagram of a computer operable to execute the disclosed system in accordance with an aspect of the claimed subject matter.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the illustrative environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are illustrative and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 11:
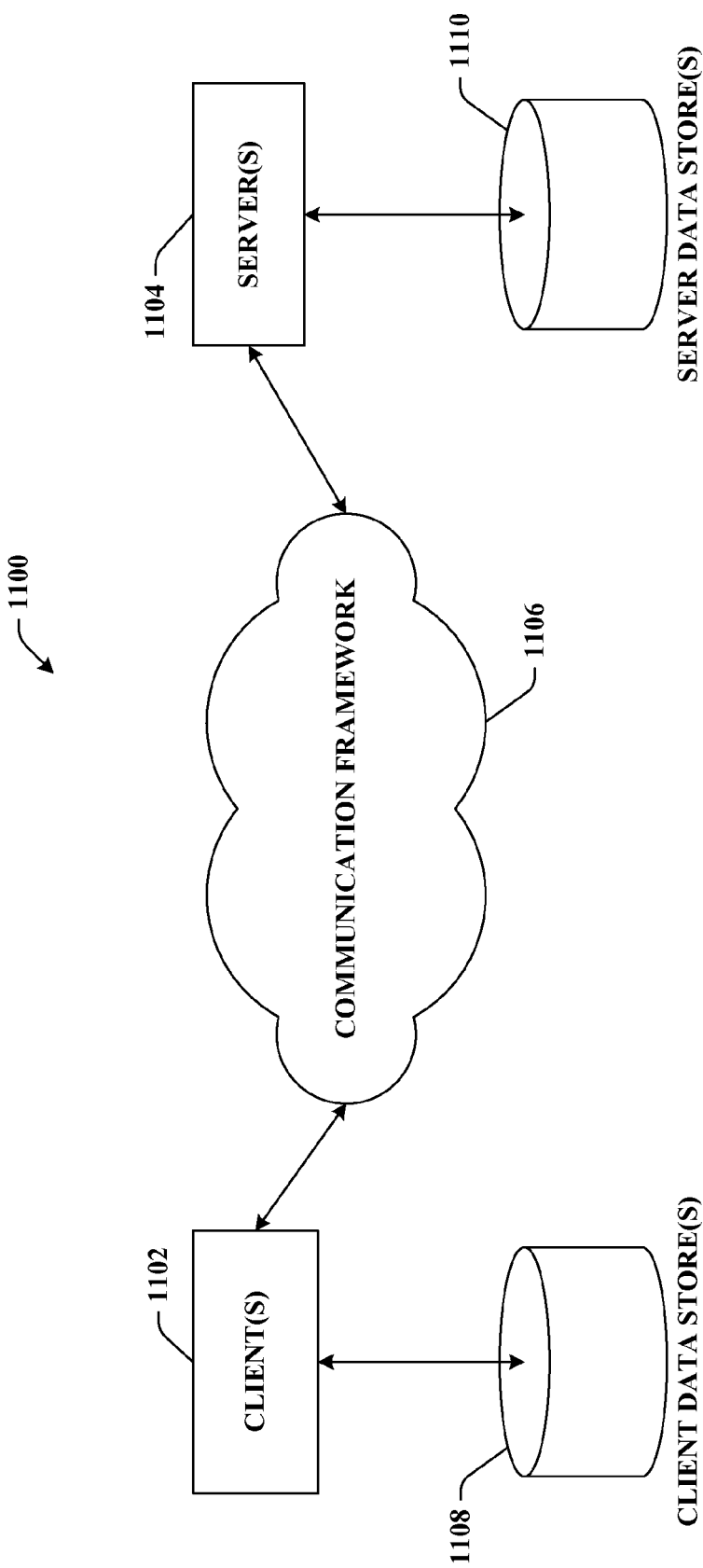
FIG. 11 illustrates a schematic block diagram of an illustrative computing environment for processing the disclosed architecture in accordance with another aspect.

Referring now to FIG. 11, there is illustrated a schematic block diagram of an illustrative computing environment 1100 for processing the disclosed architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that effectuates utilization of fine-grained concurrency in parallel processing and efficient management of established memory structures, comprising:
    a general purpose memory that retains instructions related to initializing the general purpose memory to establish a memory structure, associating the memory structure with a first processor that is a member of a processor complex, utilizing an enqueue at head operation to add work descriptors to the memory structure associated with the first processor, based at least in part on a policy that utilizes at least a low watermark, the first processor utilizes a dequeue at tail operation to retrieve work descriptors from a second memory structure associated with a second processor that is a member of the processor complex, and based at least in part on the policy that employs at least a high watermark, the first processor initiates an enqueue at tail operation to transfer work descriptors from the memory structure associated with the first processor to the second memory structure associated with the second processor; and
    a processor, coupled to the general purpose memory, configured to execute the instructions retained in the general purpose memory.

2. The system of claim 1, at least one of the enqueue at head operation, the enqueue at tail operation, the dequeue at tail operation, or a dequeue at head operation implemented as an instruction set architecture (ISA) extension.

3. The system of claim 2, the at least one of the enqueue at head operation, the enqueue at tail operation, the dequeue at tail operation, or the dequeue at head operation utilized to manage work synchronization between the first processor or the second processor the work synchronization actuated based at least in part on the policy.

4. The system of claim 1, the memory structure associated with the first processor or the second memory structure affiliated with the second processor dynamically adaptable based at least in part on resource availability, the memory structure includes one or more further memory structures associated with the first processor or the second memory structure includes one or more additional memory structures allied with the second processor.

5. The system of claim 4, the memory structure associated with the first processor aligned with a first page boundary in the general purpose memory or the second memory structure affiliated with the second processor aligned at a second page boundary in the general purpose memory, the one or more further memory structure or the one or more additional memory structures each aligned with further or additional page boundaries in the general purpose memory.

6. The system of claim 5, the policy utilizes the first page boundary, the second page boundary, or the further or additional page boundaries in general purpose memory to associate the first page boundary with the first processor, affiliate the second page boundary with the second processor, or confederate the further or additional page boundaries with one or more of the first processor, the second processor, or a plurality of tertiary or quaternary processors included in the processor complex.

7. The system of claim 1, the memory structure associated with the first processor or the second memory structure associated with the second processor being substantially symmetrical.

8. The system of claim 1, the memory structure includes a metadata aspect and a data area aspect.

9. The system of claim 8, the data area aspect contains at least one work descriptor, the at least one work descriptor is of a fixed size.

10. A machine implemented method that effectuates utilization of fine-grained concurrency in parallel processing and efficient management of established memory structures, comprising:
    establishing a memory structure; associating the memory structure with a first core;
    utilizing an enqueue at head operation to add work descriptors to the memory structure associated with the first core;
    applying an enqueue at tail operation on a second memory structure associated with a second core when a policy directs a first core to initiate the enqueue at tail operation; and
    utilizing a dequeue at tail operation on the second memory structure associated with the second core when the policy directs the first core to actuate the dequeue at tail operation.

11. The method of claim 10, the first core and the second core included in a multi-core phalanx.

12. The method of claim 10, further comprising employing a dequeue at head operation to remove work descriptors from the memory structure associated with the first core.

13. The method of claim 10, the applying an enqueue at tail operation on the second memory structure associated with the second core further comprising performing a dequeue at tail operation on the memory structure associated with the first core based at least in part on a directive issued by the policy.

14. The method of claim 10, the utilizing a dequeue at tail operation on the second memory structure associated with the second core further comprising applying a enqueue at tail operation on the memory structure associated with the first core based at least in part on an indication provided by the policy.

15. The method of claim 10, further comprising aligning the memory structure affiliated with the first core with a first page boundary and aligning the second memory structure associated with the second core with a second page boundary, the first page boundary providing the memory structure affiliated with the first core a unique identity and the second page boundary providing the second memory structure associated with the second core a distinct entity.

16. The method of claim 10, the memory structure affiliated with the first core and the second memory structure associated with the second core established in a generic hardware memory, the memory structure affiliated with the first core and the second memory structure associated with the second core symmetric between the first core and the second core, the memory structure affiliated with the first core and the second memory structure associated with the second core adaptable based at least in part on memory resource availability.

17. The method of claim 10, at least one of the enqueue at head operation, the enqueue at tail operation, or the dequeue at tail operation implement by way of an instruction set architecture (ISA) extension.

18. A computer-readable storage medium storing instructions, the instructions in response to execution by at least one computing device causing operations comprising structures, comprising:
    creating a memory structure;
    associating the memory structure with a first processor;
    utilizing an enqueue at head operation to add work descriptors to the memory structure associated with the first processor;
    applying an enqueue at tail operation on a second memory structure associated with a second processor; and
    utilizing a dequeue at tail operation on the second memory structure associated with the second processor.

19. The computer-readable storage medium of claim 18, the operations further comprising performing processing by the first processor and the second processor in parallel.

20. The computer-readable storage medium of claim 18, the operations further comprising uniquely identifying memory structure associated with the first processor and the second memory structure associated with the second processor based at least in part on a page boundary at which the memory structure associated with the first processor and the second memory structure associated with the second processor are respectively located.

* * * * *